UNITED STATES PATENT OFFICE.

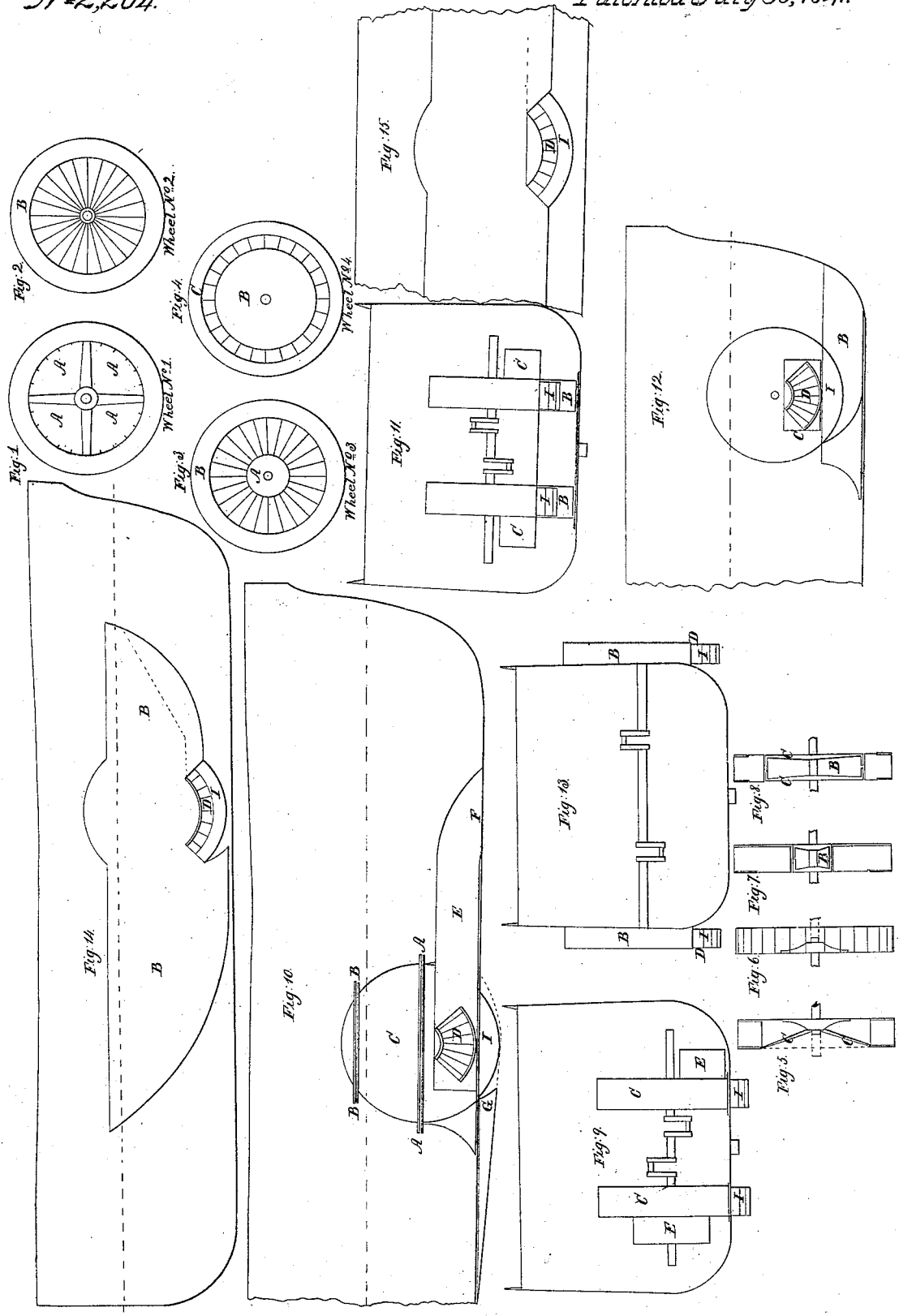

ELISHA F. ALDRICH, OF NEW YORK, N. Y.

IMPROVEMENT IN THE MODE OF PROPELLING SHIPS, BOATS, AND OTHER VESSELS.

Specification forming part of Letters Patent No. 2,204, dated July 30, 1841; antedated January 30, 1841.

*To all whom it may concern:*

Be it known that I, ELISHA F. ALDRICH, of the city, county, and State of New York, have invented a new and useful Mode of Propelling Ships, Boats, and other Vessels; and I do hereby declare that the following is a full and exact description.

The nature of my invention consists in the construction of the wheels and placing them wholly or a part within the vessel or upon its sides nearly as low as the bottom. The wheels are to revolve within cases. Water is admitted into the wheels at or any distance from the center, and is forced out by the action of the centrifugal force from that part of the periphery of the wheels below the bottom or below the cases. The reaction upon the shaft is the same as that produced by the action of the common paddle-wheel. The wheels may be made to revolve vertically or horizontally.

To enable others skilled in the art to make and use my invention, I will proceed to describe its construction and operation.

The wheels may be constructed in a number of different modes. The outside of those already used are represented by Figs. 1, 2, 3, and 4. Two circular plates of metal are put upon the shaft, between which the floats are placed and bolted or otherwise permanently fastened to the plates. The floats may terminate at or any distance from the center of the wheels.

A A, Fig. 1, represent spaces or openings in the outside plate, through which water is admitted into the wheels. The center of the outside plate may be entirely removed, as represented at Fig. 2, and, if necessary, the rim B may be supported by angular braces touching the inside plate at or near the shaft, as represented by C C, Fig. 5.

Fig. 3 represents a wheel constructed in the same manner as those described, with the exception that the inner ends of the floats are fastened to the periphery of a small wheel that is made fast to the shaft. A, Fig. 3, will represent the center wheel, and B the rim, between which the water passes into the wheel.

Fig. 4 represents a wheel constructed by riveting, bolting, or otherwise fastening the floats to the periphery of the wheel B. C will represent the rim, which is firmly secured to the floats, both sides being made the same.

The small wheel B, Fig. 4, which forms the center of the water-wheel, and to which the floats are attached, may be made of cast-iron. The plates that form the sides of the wheel, and are attached or keyed fast to the shaft, would be thicker in the center, where the shaft passes through, than at the circumference. Upon the circumference a flange or rim would be cast projecting from the plate at right angles to radius—that is to say, the flange or rim would stand parallel to the shaft or axis of the wheel. The rim would be half the width of the wheel, the edges of which would be turned and fitted in such a manner that the two will shut together and make a wheel of the required width, as represented at B B, Figs. 7 and 8; or the rim may be cast wholly upon one plate, and the plate to form the opposite side of the wheel would be fitted into the rim and bolted or otherwise fastened to the same. The plates may be made without the flanges or rims, the surface of the periphery of the wheel being formed by placing metallic plates upon the circumference of the plates represented at C C, Fig. 8, and bolting or otherwise fastening them together.

Fig. 5 represents a sectional view of wheel No. 1, supposing it to be cut into two parts in the direction of radius. Fig. 7 represents the same view of wheel No. 3, and Fig. 8 represents the same view of wheel No. 4. Fig. 6 represents an edge view of wheel No. 2. The cases in which the wheels revolve may be made of wood or metal. If of the former, they would be framed up at the sides and planked and coppered upon the inside, and if made of metal they are to be of plate-iron. In either case it may be necessary to have ribs of wrought-iron that would be bolted or otherwise fastened to the sides of the cases and to extend entirely over the same and be securely fastened to the bottom of the vessel. The cases may be bolted to plates of cast-iron and said plates secured to the bottom of the ship. The cases may be made in separate parts to be taken apart at the center and any distance above the center, as represented at A A and B B, Fig. 10. Two objects would be accomplished in making the cases in separate parts—the wheels could be put in their places with less difficulty and the upper segment could be taken off to repair the wheel in case of accident.

C C, Figs. 9 and 10, represent an edge and side view of the cases and their position in the vessel when the wheels project below the bottom abaft of midship. E E, Figs. 9 and 10, represent the pipes that admit water to the wheels at or any distance below the center. D, Fig. 10, represents the space through the case to admit water into the wheel. Water may be admitted into the pipe through the bottom at F, Fig. 10, or in any other direction that may be found best. The wheel may be made narrower than the case and the water pass into it from both sides. By adopting this plan the pipe would be dispensed with. If the wheel is made narrower than the case, it would be necessary to have it run close to the inside of the same that there may be no water (or very little) forced from any part of the wheel, except that part below the bottom or below the case. The wheel represented at Fig. 4 would be the one used when the water is admitted directly into the wheels without passing through pipes. I I, Figs. 9 and 10, represent the portion of wheel below the bottom. G, Fig. 10, represents a shoe or covering in front of the wheels tapering toward the bow, covering a part of the wheel, not so close, however, as to prevent the free emission of water. The wheels can be protected upon each side by pieces projecting as low as the wheels and rounded off toward the stern, as represented by the dotted line, Fig. 10.

Figs. 11 and 12 represent an edge and side view of wheels and cases placed wholly within the vessel. The cases and wheels are made as those described, with the exception of being raised up to give room for the pipes B B. The water passes out at the stern through the pipe B, Fig. 12, after being operated upon by the wheel. C C represent the pipes that admit the water to the wheels, which may be admitted into the pipes in any direction that may be found best. D, Fig. 12, will represent the space in the case through which water is admitted into the wheel.

Figs. 13 and 14 represent an end and side view of wheels placed outside of the vessel nearly as low as her bottom. B B will represent the cases in which the wheels revolve. The cases are tapered off fore and aft to give a good line. The cases may be shaped off, as represented by the dotted lines, Figs. 14 and 15. The wheel represented at Fig. 4 is such as is used outside of the vessel. In placing this kind of wheel upon the side of the vessel nearly or altogether below the water-line the vessel will be planked in the usual manner. Extra timbers may be permanently fastened to the sides, projecting out to a sufficient distance to form the cases for the wheels, which would be from one foot six inches to two feet six inches broad. After the wheels are put in their places the planking to form the outside of the cases could be done. The cases may be constructed separate from the ship, and when finished can be bolted or otherwise fastened to the sides of the same. Other modes of constructing the cases outside of the vessel may be adopted, particularly if the plan should be used for iron vessels. The breadth, diameter, and number of revolutions of the wheels per minute would vary for different-sized vessels. As soon as the wheels are set in motion the water between the floats will be forced from that part of the wheel that is in operation, or that part below the bottom or below the case, and other water will be forced into the wheels at D D, Figs. 10, 12, 14, and 15, by the pressure of the atmosphere and the hydro column above the orifice. Thus I have described wheels that may be placed each side of the keelson abaft of midship, projecting through the bottom, as represented at Figs. 9 and 10; or the wheels may be placed wholly within the vessel, as represented by Figs. 11 and 12; or the wheels may be placed outside of the vessel, as represented by Figs. 13, 14, and 15.

The floats of the wheels above described may form an angle to radius, or may form an angle with the axis of the wheels, or may be made circular or convolute. The theoretical operations of the wheels are all the same. They having a high velocity, the water will be forced from the wheels by the centrifugal pressure, and as the water can only escape from a portion of the wheels, which would be represented by eighty to one hundred and twenty degrees, and as the reaction must all take place in that part of the wheels that is below the bottom or below the cases, the shaft must necessarily be pressed against its boxes precisely in the same manner as it is when the paddles strike the water to give the propelling effect, the water receiving all its motion or impulse in that part of the wheels where it will propel the vessel. There can therefore be no loss of power, except it is by the friction of the water within the cases, which would be less than the resistance of the air to the common paddle-wheel. Owing to the great pressure that can be obtained to force the water into the wheels and the peculiar effect of the centrifugal force to throw it out, an effect can be produced from any given quantity of moving power as great if not greater than is produced from the best modification of the common paddle-wheel in smooth water.

For all vessels navigating the ocean by steam, for canals, and more especially for vessels of war, my plans will have a decided advantage over the common paddle-wheel.

What I claim as my invention, and desire to secure by Letters Patent, is—

1. The method of propelling ships, boats, and other vessels by means of wheels that receive water at the center or any distance from the center and throw it out at the periphery by the action of the centrifugal force, as herein described.

2. The mode described and set forth of constructing the wheels to be applied to vessels for the propulsion of the same, the wheels to revolve vertically or horizontally.

3. The mode of placing the wheels nearly or quite as low as the bottom of the vessel, to revolve within cases attached to the outside of the same, as described.

ELISHA F. ALDRICH.

Witnesses:
NAPOLEON B. MOUNTFORT,
ROBERT TAYLOR.